United States Patent
Kuo

(10) Patent No.: US 10,194,597 B2
(45) Date of Patent: Feb. 5, 2019

(54) METHOD AND SYSTEM OF CULTIVATING AQUATIC PRODUCT AND PLANT

(71) Applicant: Chi-Tse Kuo, Taichung (TW)

(72) Inventor: Chi-Tse Kuo, Taichung (TW)

( * ) Notice: Subject to any disclaimer, the term of this patent is extended or adjusted under 35 U.S.C. 154(b) by 262 days.

(21) Appl. No.: 15/150,294

(22) Filed: May 9, 2016

(65) Prior Publication Data

US 2017/0318762 A1   Nov. 9, 2017

(51) Int. Cl.
| | |
|---|---|
| A01G 31/02 | (2006.01) |
| A01G 22/00 | (2018.01) |
| C02F 9/00 | (2006.01) |
| A01G 31/00 | (2018.01) |
| C02F 1/24 | (2006.01) |
| C02F 1/44 | (2006.01) |
| C02F 1/78 | (2006.01) |
| C02F 101/16 | (2006.01) |

(52) U.S. Cl.
CPC .............. *A01G 22/00* (2018.02); *C02F 9/00* (2013.01); *A01G 31/00* (2013.01); *C02F 1/24* (2013.01); *C02F 1/442* (2013.01); *C02F 1/444* (2013.01); *C02F 1/78* (2013.01); *C02F 2101/16* (2013.01); *C02F 2101/166* (2013.01); *Y02P 60/216* (2015.11)

(58) Field of Classification Search
CPC .. A01G 31/00; A01G 31/02; A01G 2031/006; A01G 22/00; C02F 9/00
USPC ..... 47/59 R, 60, 62 A, 62 R, 62 N; 119/226, 119/231, 245–249, 254, 259, 261, 263, 119/269
See application file for complete search history.

(56) References Cited

U.S. PATENT DOCUMENTS

| | | | | |
|---|---|---|---|---|
| 3,957,017 A | * | 5/1976 | Carmignani | A01K 63/04 119/227 |
| 4,988,436 A | * | 1/1991 | Cole | A01K 63/04 119/260 |
| 5,514,282 A | * | 5/1996 | Hibbard | B01D 61/04 210/195.2 |
| 8,677,686 B1 | * | 3/2014 | Nelson | A01G 31/02 47/62 R |
| 2015/0373954 A1 | * | 12/2015 | Kuo | C02F 1/24 210/151 |
| 2016/0113249 A1 | * | 4/2016 | Kuo | A01K 63/04 210/167.26 |

* cited by examiner

*Primary Examiner* — David J Parsley
*Assistant Examiner* — Danielle A Clerkley

(57) ABSTRACT

A method of cultivating aquatic product and plant contains steps of: (A) Preparing a cultivation tank with cultivation water; (B) Aerating the cultivation water; (C) Drawing overflow water in a top of the cultivation tank and foul water in a bottom of the cultivation tank into a protein separator and a first ultrafiltration unit; (D) Collecting bubbled fluid from the protein separator and concentrated waste fluid from the first ultrafiltration unit into a collection chamber; (E) Pumping the cultivation wastewater into a second ultrafiltration unit and filtering the cultivation wastewater by using ultrafiltration films of the second ultrafiltration unit; (F) Discharging cloudy high-protein concentration fluid into a first gathering bucket; (G) Pumping filtered fluid filtered by the plurality of ultrafiltration films of the second ultrafiltration unit into a Nano-filtration unit; and (H) Flowing the recyclable water into the cultivation tank from the recycle tank.

5 Claims, 3 Drawing Sheets

METHOD AND SYSTEM OF CULTIVATING AQUATIC PRODUCT AND PLANT

FIELD OF THE INVENTION

The present invention relates to a method of processing cultivation water, and more particularly to a method of cultivating aquatic product and plant which enhances recycle efficiency of recyclable water and separates high-protein concentration fluid from cultivation wastewater so as to provide nutrient to aquatic product and plant.

BACKGROUND OF THE INVENTION

Water treatment equipment for recirculating aquaculture is disclosed in U.S. Filing Ser. No. 14/317,803 by inventor, and it pumps cultivation water into a cultivation tank, and the cultivation water is aerated in the cultivation tank by way of aeration equipment so as to provide oxygen, and an overflow water pipe connects with a purifier, such that the water is filtered, purified, and flows back to the cultivation tank.

To reduce concentration of ammonia and nitrogen, a protein separator is configured to replace a nitrifying bacteria layer, such that mucus (such as protein) and aerosols are eliminated from water by using bubbles, and a plurality of filtration films are not blocked by the mucus. On the other hands, oxygen in the water is increased.

However, the water treatment equipment has defects as follows:

1. Most part of the cultivation water is drained as separating protein from the cultivation water by mean of the protein separator, so at least 10% of cultivation water has to be extra added into the cultivation tank.

2. The water treatment equipment is capable of spraying clean water to wash a plurality of filtration films, but the cultivation water becomes fouled after the clean water flows into the filtration tank, so some of the cultivation water is drained because suspension solids increase, thus reducing recyclable efficiency.

In addition, cultivation wastewater from the protein separator contains ammonia, nitrogen, and phosphorus to contaminate the cultivation water.

The present invention has arisen to mitigate and/or obviate the afore-described disadvantages.

SUMMARY OF THE INVENTION

The primary objective of the present invention is to provide a method and a system of cultivating aquatic product and plant which enhances recycle efficiency of recyclable water and separates high-protein concentration fluid from cultivation wastewater so as to provide nutrient to aquatic product and plant.

To obtain the above objective, a method of cultivating aquatic product and plant provided by the present invention contains steps of:

(A) Preparing a cultivation tank in which cultivation water is accommodated;

(B) Aerating the cultivation water in the cultivation tank so as to provide dissolved oxygen to the cultivation water;

(C) Drawing overflow water in a top of the cultivation tank and foul water in a bottom of the cultivation tank into a protein separator and a first ultrafiltration unit in a flat disc shape, wherein the first ultrafiltration unit filters the cultivation water so as to produce recyclable water, and the recyclable water is drawn back to the cultivation tank from the protein separator, wherein spray gas is drawn from a bubble generation unit of the protein separator and mixes with water so as to produce bubbles to attach protein, bait, excreta and molecule colloids on the bubbles, and the bubbles are pushed upwardly so as to form bubbled fluid, then the bubbled fluid flows downwardly to separate bubbles of the bubbled fluid from water of the bubbled fluid, thereafter the water flows back to the cultivation tank;

(D) Collecting the bubbled fluid from the protein separator and concentrated waste fluid from the first ultrafiltration unit into a collection chamber so as to generate cultivation wastewater;

(E) Pumping the cultivation wastewater into a second ultrafiltration unit in a flat disc shape and filtering the cultivation wastewater by using a plurality of ultrafiltration films of the second ultrafiltration unit, wherein solid suspension substances and macromolecules in the water are maintained by the plurality of ultrafiltration films of the second ultrafiltration unit so as to separate filtered fluid and cloudy high-protein concentration fluid;

(F) Discharging the cloudy high-protein concentration fluid into a first gathering bucket so as to use as organic fertilizer nutrients in a plant factory or biological bait broth to aquaculture industry;

(G) Pumping the filtered fluid filtered by the plurality of ultrafiltration films of the second ultrafiltration unit into a Nano-filtration unit so as to filter the filtered fluid, wherein multiple Nano-filtration films eliminate ammonia nitrogen in the filtered fluid, thus producing the recyclable water with amino acids, and the water is maintained to form clear high-protein concentration fluid used as culture fluid to hydroponic plants, seaweed, or fern;

(H) Flowing the recyclable water into the cultivation tank from the recycle tank.

A system of cultivating aquatic product and plant provided by the present invention is fixed between a cultivation tank and a plant factory and contains:

a cultivation tank in which cultivation water is accommodated;

a blower configured to pump air into the cultivation tank and to provide dissolved oxygen to the cultivation water;

a first pump including a first tube located below the cultivation water, and the first pump including a second tube extending toward a bottom of the cultivation tank and communicating with the first tube;

a protein separator including a hollow cylinder communicating with the second tube, a bubble generation unit fixed in the hollow cylinder, an outlet pipe extending toward the cultivation tank from the hollow cylinder, and a bubble pipe, wherein the bubble generation unit draws spray gas and mixes the spray gas with water in the hollow cylinder so as to produce bubbles to attach protein, bait, excreta and molecule colloids on the bubbles, and the bubbles are pushed upwardly so as to form bubbled fluid, then the bubbled fluid drains through the bubble pipe so as to separate bubbles of the bubbled fluid from water of the bubbled fluid, thereafter the water flows downwardly back to the cultivation tank from the outlet pipe;

a collection chamber configured to hold the bubbled fluid flowing through the bubble pipe and to form cultivation wastewater;

a plurality of ultrafiltration units, and the cultivation wastewater is pumped into each of the plurality of ultrafiltration units, and said each ultrafiltration unit including a plurality of ultrafiltration films equidistantly arranged and configured to maintain mucus and solid suspension substances in the water so as to separate filtered fluid from cloudy high-protein concentration fluid;

a first gathering bucket configured to hold the cloudy high-protein concentration fluid used as organic fertilizer nutrients in a plant factory or biological bait broth to aquaculture industry;

a Nano-filtration unit connected with one side of the first ultrafiltration unit and accommodating the filtered fluid, wherein the Nano-filtration unit includes multiple Nano-filtration films configured to eliminate ammonia nitrogen in the filtered fluid so as to produce recyclable water with amino acids, and the water is maintained to form clear high-protein concentration fluid;

a recycle tank configured to hold the recyclable water from the Nano-filtration unit; and a second pump used to pump the recyclable water back to the cultivation tank.

DETAILED DESCRIPTION OF THE PREFERRED EMBODIMENTS

Figure 1:
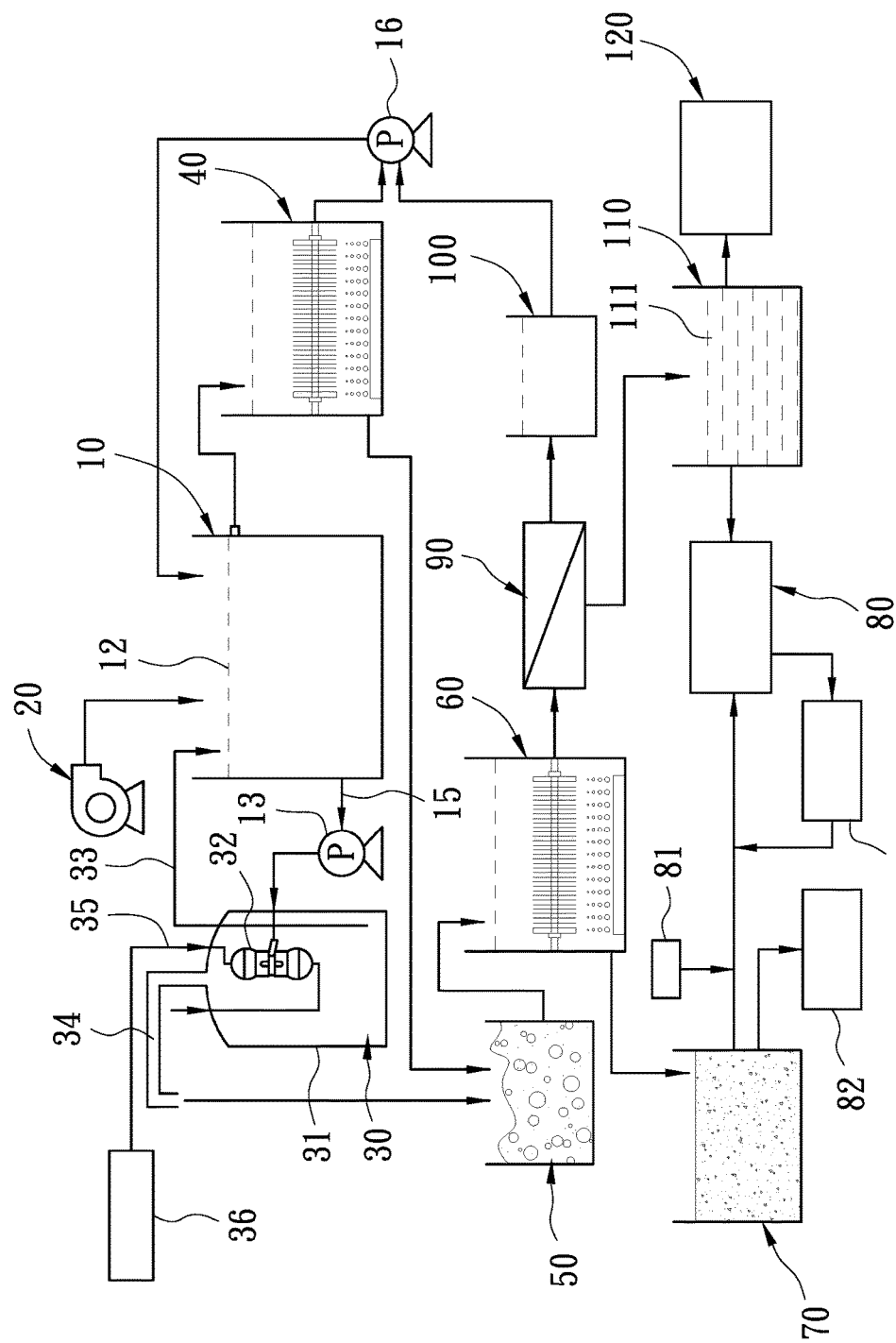
FIG. 1 is a diagram view showing the assembly of a system of cultivating aquatic product and plant according to a preferred embodiment of the present invention.
Figure 2:
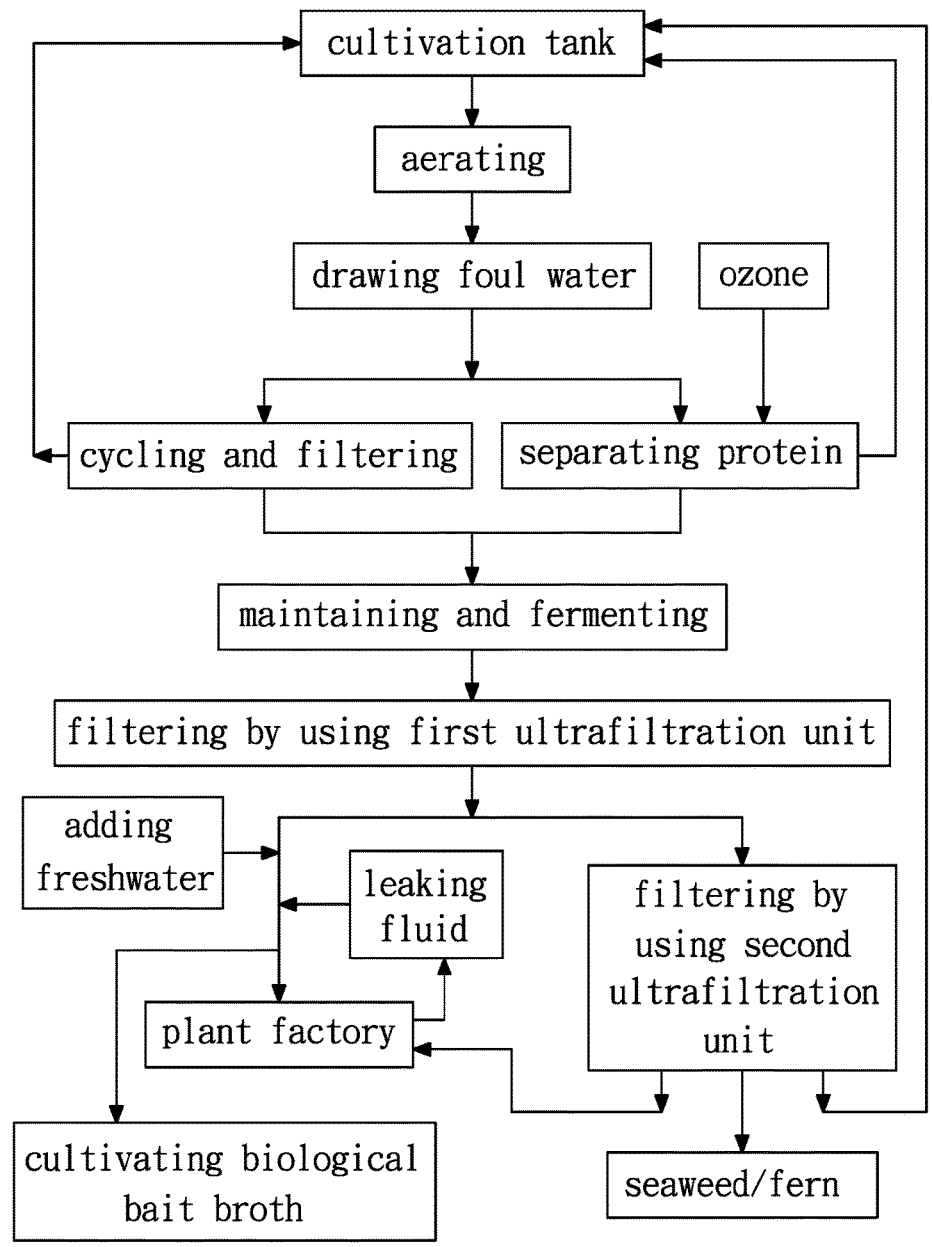
FIG. 2 is a flow chart of a method of cultivating aquatic product and plant according to a preferred embodiment of the present invention.
Figure 3:
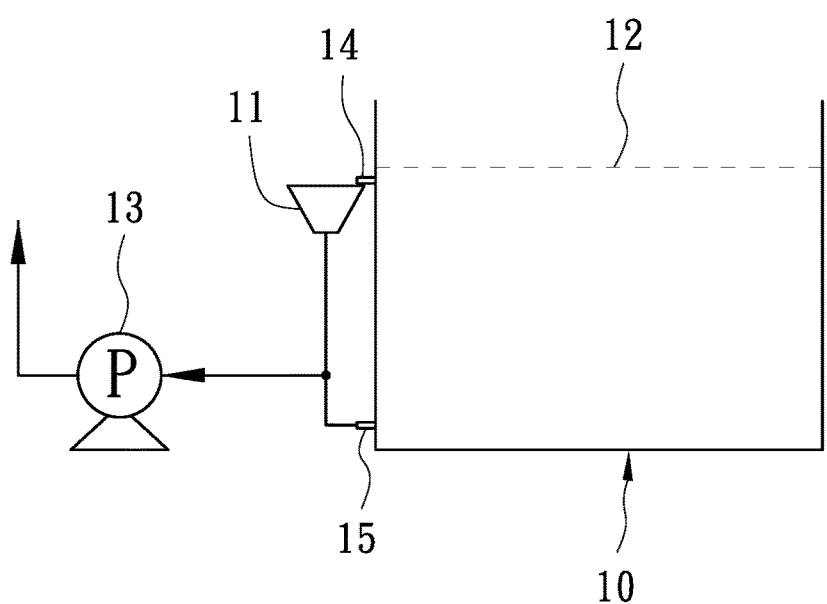
FIG. 3 is a diagram view showing the assembly of a part of system of cultivating aquatic product and plant according to the preferred embodiment of the present invention.

With reference to FIGS. 1 and 2, a method of cultivating aquatic product and plant according to a preferred embodiment of the present invention comprises steps of:

(A) Preparing a cultivation tank 10 which includes a discharge cavity 11 (as shown in FIG. 3) in which cultivation water 12 is accommodated, wherein a PH value and a solid concentration of the cultivation water 12 are adjusted, and edible salt and chemical salt are added in the cultivation water 12 so as to comply with quality requirement of the cultivation water 12.

(B) Aerating the cultivation water 12 in the cultivation tank 10 so as to provide dissolved oxygen to the cultivation water 12, wherein a blower 20 is mounted on one side of the cultivation tank 10 so as to pump air into the cultivation tank 10 and to drain residue feeding and excreta out of the cultivation tank 10 by using the discharge cavity 11.

(C) Drawing overflow water in a top of the cultivation tank 10 and foul water in a bottom of the cultivation tank 10 into a protein separator 30 and a first ultrafiltration unit 40 in a flat disc shape. Referring further to FIG. 3, the foul water is drawn to the protein separator 30 via a first pump 13, wherein the first pump 13 includes a first tube 14 adjacent to the discharge cavity 11 and includes a second tube 15 extending toward the bottom of the cultivation tank 10 and communicating with the first tube 14.

The protein separator 30 includes a hollow cylinder 31 communicating with the second tube 15, a bubble generation unit 32 fixed in the hollow cylinder 31, an outlet pipe 33 extending toward the cultivation tank 10 from a bottom of the hollow cylinder 31, and a bubble pipe 34 secured in a top of the hollow cylinder 31.

The first ultrafiltration unit 40 includes a plurality of ultrafiltration films equidistantly arranged and disclosed in TW Patent Nos. I312767, I318233, and I348389, hence recyclable water forms after water is filtered by the plurality of ultrafiltration films from the cultivation tank 10. Thereafter, the recyclable water is drawn back to the cultivation tank 10 by a second pump 16, and concentrated waste fluid is maintained and discharges to a collection chamber 50.

Spray gas 35 is drawn into the bubble generation unit 32 and mixes with the water so as to produce bubbles to attach protein, bait, excreta and molecule colloids (such as faded shells or fish scale) on the bubbles, and the bubbles are pushed upwardly so as to form bubbled fluid, then the bubbled fluid flows into the collection chamber 50 through the bubble pipe 34 so as to separate bubbles of the bubbled fluid from water of the bubbled fluid. Thereafter, the water flows downwardly back to the cultivation tank 10 from the outlet pipe 33.

Furthermore, the spray gas 35 mixes with ozone 36 of high concentration so as to sterilize bacteria in the cultivation water 12, and the protein separator 30 is used as an ozone reaction chamber configured to adjust inflow of the ozone 36, such that excessive ozone oxidizes ammonia and nitrite in the water to nitrate nitrogen or nitrogen, and the protein separator 30 eliminates ammonia and nitrogen.

The method of the present invention further comprises steps of:

(D) Collecting the bubbled fluid from the protein separator 30 and the concentrated waste fluid from the first ultrafiltration unit 40 (or the foul water produced by washing the plurality of ultrafiltration films) into the collection chamber 50 so as to generate cultivation wastewater with high ammonia and suspension concentration.

(E) Pumping the cultivation wastewater into a second ultrafiltration unit 60 in a flat disc shape and filtering the cultivation wastewater by using a plurality of ultrafiltration films of the second ultrafiltration unit 60, wherein mucus, solid suspension substances and macromolecules in water are maintained by the plurality of ultrafiltration films so as to separate filtered fluid and cloudy high-protein concentration fluid.

(F) Discharging the cloudy high-protein concentration fluid into a first gathering bucket 70, wherein the cloudy high-protein concentration fluid contains protein, amino acids, fat, and carbohydrate which exist in a concentrated liquid form or a paste form, hence the cloudy high-protein concentration fluid mixes into culture soil so as to produce organic fertilizer nutrients in a plant factory 80. Alternatively, the cloudy high-protein concentration fluid is diluted by adding freshwater 81 so as to form biological bait broth 82 to aquaculture industry.

(G) Pumping the filtered fluid filtered by the plurality of ultrafiltration films of the second ultrafiltration unit 60 into a Nano-filtration unit 90 so as to filter the filtered fluid again, wherein multiple Nano-filtration films eliminate ammonia nitrogen, dissolved organic substances, and nitrite slat in the filtered fluid, thus producing the recyclable water with amino acids. Thereafter, the recyclable water is stored in a recycle tank 100 and is maintained by the multiple Nano-filtration films so as to form clear high-protein concentration fluid 111 which is held by a second gathering bucket 110. The clear high-protein concentration fluid 111 is used as culture fluid 120 to culture fluid to hydroponic plants, seaweed, or fern.

(H) Flowing the recyclable water into the cultivation tank 10 from the recycle tank 100.

To provide nutrient solution to the plant factory 80, concentration of the cloudy high-protein concentration fluid in step (F) to step (G) is adjusted, for example, adding the freshwater 81 into the first gathering bucket 70 and the second gathering bucket 110 so as to dilute the concentration of the cloudy high-protein concentration fluid required by the plant factory 80.

Furthermore, the plant factory 80 drains leaking fluid 83 out of a bench after cultivation, and the leaking fluid 83 flows back to the first gathering bucket 70 so as to mix with the cloudy high-protein concentration fluid, thus reducing water consumption and cultivation cost.

Thereby, the method of the present invention drains the bubbled fluid from the protein separator 30, filters the cultivation water in the cultivation tank 10 so as to maintain the concentrated waste fluid, and collects and accommodates spray water sprayed to the plurality of ultrafiltration films so as to produce the cultivation wastewater. Thereafter, the cultivation wastewater is filtered and separated by the plurality of ultrafiltration films so as to form the cloudy high-protein concentration fluid and the filtered fluid, and the filtered fluid is filtered by the Nano-filtration films (UF films) so as to produce the recyclable water in compliance with the quality requirement of the cultivation water, thus saving water consumption and cultivation cost and decreasing environmental pollution.

Preferably, the cloudy or clear high-protein concentration fluid is used as the nutrient solution for culturing seaweed or fern in the plant factory 80.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of cultivating aquatic product and plant comprising steps of:
   (A) Preparing a cultivation tank in which cultivation water is accommodated;
   (B) Aerating the cultivation water in the cultivation tank so as to provide dissolved oxygen to the cultivation water;
   (C) Overflowing overflow water of the cultivation water in a top of the cultivation tank into a first ultrafiltration unit in a flat disc shape and drawing foul water of the cultivation water in a bottom of the cultivation tank into a protein separator, wherein the first ultrafiltration unit filters the cultivation water so as to recycle the cultivation water, and the cultivation water is drawn back to the cultivation tank from the protein separator, wherein gas is drawn into a bubble generation unit of the protein separator and mixes with the cultivation water so as to produce bubbles to attach protein, bait, excreta and molecule colloids on the bubbles, and the bubbles are pushed upwardly so as to form bubbled fluid, then the bubbled fluid flows downwardly to separate bubbles from the bubbled fluid, thereafter the cultivation water flows back to the cultivation tank;
   (D) Collecting the bubbled fluid from the protein separator and concentrated waste fluid from the first ultrafiltration unit into a collection chamber so as to generate cultivation wastewater;
   (E) Pumping the cultivation wastewater into a second ultrafiltration unit in a flat disc shape and filtering the cultivation wastewater by using a plurality of ultrafiltration films of the second ultrafiltration unit, wherein solid suspension substances and macromolecules in the cultivation wastewater are maintained by the plurality of ultrafiltration films of the second ultrafiltration unit so as to separate filtered fluid and cloudy high-protein concentration fluid;
   (F) Discharging the cloudy high-protein concentration fluid into a first gathering bucket;
   (G) Pumping the filtered fluid filtered by the plurality of ultrafiltration films of the second ultrafiltration unit into a Nano-filtration unit, wherein multiple Nano-filtration films of the Nano-filtration unit eliminate ammonia nitrogen in the filtered fluid, thus recycling the cultivation water with amino acids into a recycle tank, and the cultivation water is maintained to form clear high-protein concentration fluid used as culture fluid to hydroponic plants, seaweed, or fern
   (H) Flowing the recycled cultivation water back to the cultivation tank from the recycle tank.

2. The method as claimed in claim 1, wherein in the step of (C), the gas mixes with ozone so that the protein separator eliminates ammonia and nitrogen.

3. The method as claimed in claim 1, wherein in the step of (F), the cloudy high-protein concentration fluid is diluted by adding freshwater.

4. The method as claimed in claim 3, wherein after the cloudy high-protein concentration fluid is diluted and is absorbed by a bench, leaking fluid drains out of the bench and flows back to the first gathering bucket.

5. The method as claimed in claim 1, wherein in the step of (G), the clear high-protein concentration fluid is diluted by adding freshwater.

* * * * *